March 13, 1962     L. HOCKER     3,024,974
VOTING MACHINES
Filed May 11, 1959     6 Sheets-Sheet 1
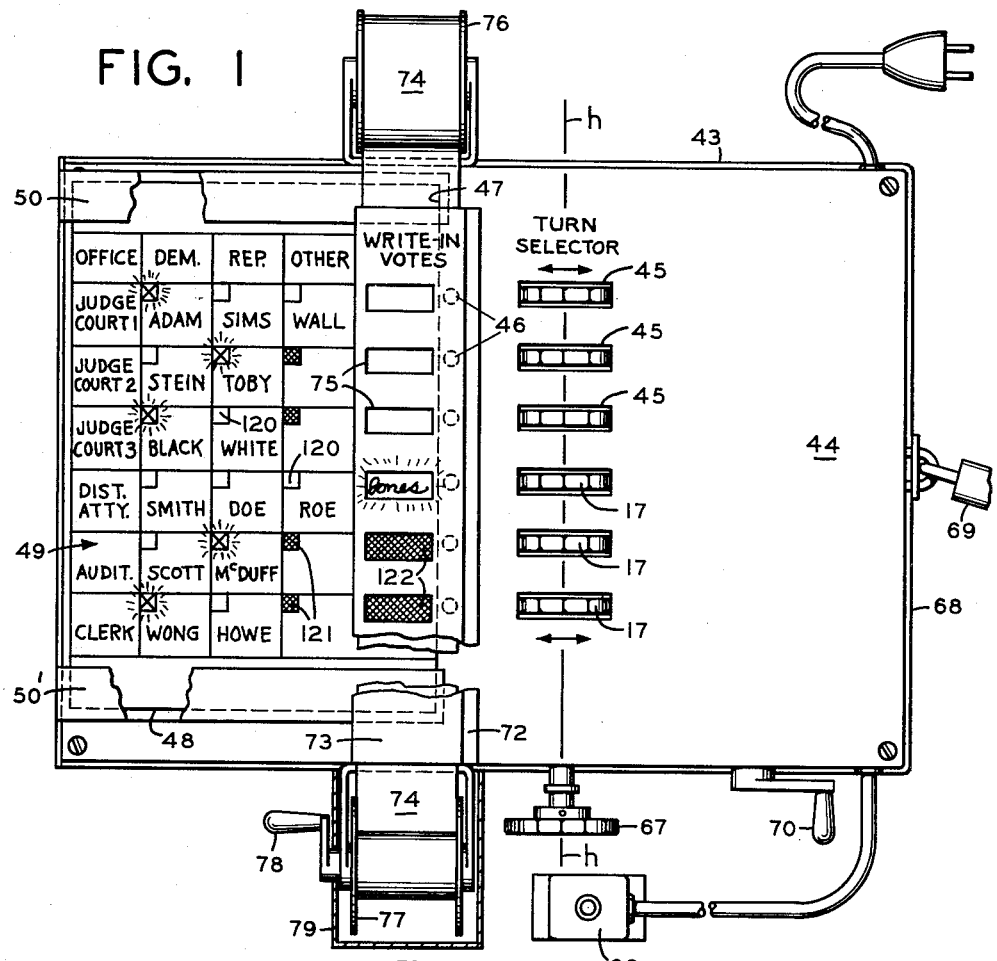
FIG. 1
FIG. 2
INVENTOR.
LON HOCKER
BY Jerome A. Gross,
ATTORNEY March 13, 1962  L. HOCKER  3,024,974
VOTING MACHINES Filed May 11, 1959  6 Sheets-Sheet 2

INVENTOR.
LON HOCKER
BY Jerome A. Gross
ATTORNEY

March 13, 1962 L. HOCKER 3,024,974
VOTING MACHINES
Filed May 11, 1959 6 Sheets-Sheet 3

INVENTOR.
LON HOCKER
BY Jerome A. Gross
ATTORNEY

March 13, 1962  L. HOCKER  3,024,974
VOTING MACHINES
Filed May 11, 1959  6 Sheets-Sheet 4
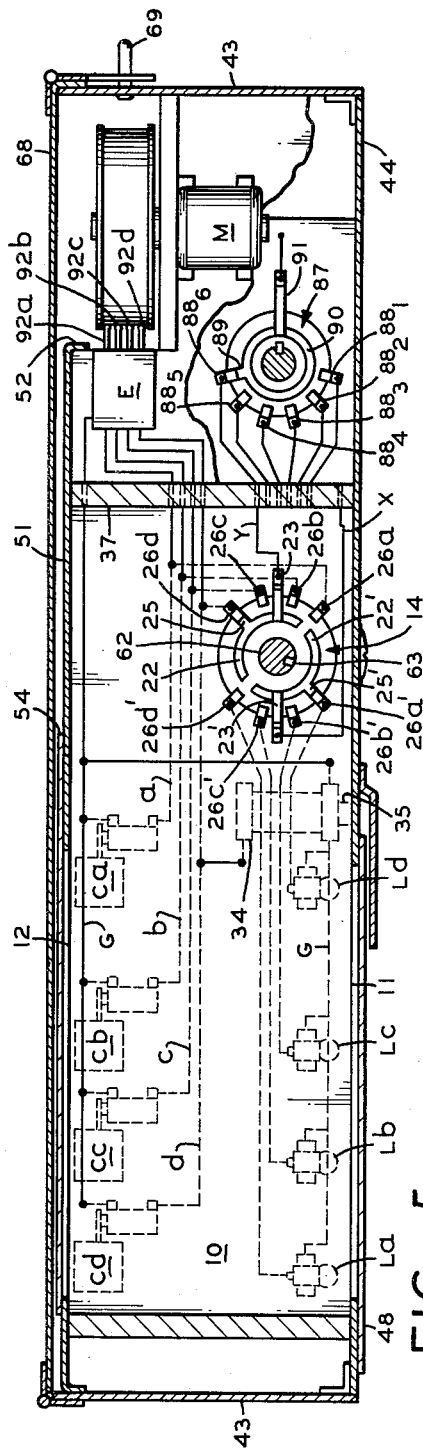
FIG. 5
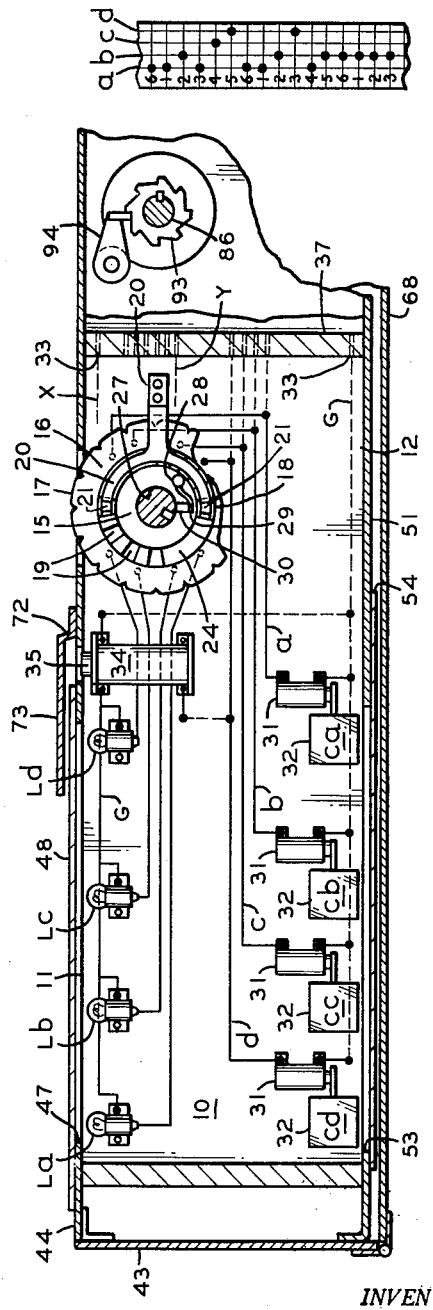
FIG. 6
FIG. 12
INVENTOR.
LON HOCKER
BY Jerome L. Gross
ATTORNEY March 13, 1962   L. HOCKER   3,024,974
VOTING MACHINES Filed May 11, 1959   6 Sheets-Sheet 5

INVENTOR.
LON HOCKER
BY Jerome A. Gross,
ATTORNEY

INVENTOR.
LON HOCKER

United States Patent Office

3,024,974
Patented Mar. 13, 1962

3,024,974
VOTING MACHINES
Lon Hocker, 7637 Shirley Drive, Clayton, Mo.
Filed May 11, 1959, Ser. No. 812,398
2 Claims. (Cl. 235—51)

The present invention relates to voting machines and the like, wherein the selection by the voter from among candidates for several offices (or other selection by a user between alternative choices on a number of issues) is readily presented, made, recorded and counted.

The objects of the present invention include providing an electrical apparatus which meets the legal criteria for voting machine performance, but which is simple in design and inexpensive of construction; easy to service, assemble and maintain; and light in weight so that it may be readily delivered to and removed from polling places.

A further object is to provide a voting machine having selection indication means, preferably indicator lights coupled with a single choice selector for all mutually exclusive candidates, from which no recording signal is evoked until the voter, having made all his choices, determines to cast his votes for the choices indicated on the selection-indication means.

Another purpose is to provide for the operation of the choice selectors either as a gang or individually, so that the voter may select a "straight ticket" but yet make selective deviations therefrom and so that the voter may, after voing, erase his selections with one movement.

Another object is to provide a voting machine utilizing an interchangeable ballot capable of being marked and cast manually, where voting machines are not available, and substantially identical in form to the most common type of manual ballot presently in use, to which the greatest number of voters are accustomed.

A further purpose is to provide in connection with such an electric machine, a paper ballot strip for writing-in for particular offices the names of persons not named on such printed ballot together with automatic means for verifying that a given voter had not voted for two candidates for that office.

Still another purpose is to provide in connection with such an electric voting machine, a single, complete printed ballot in the customary form of manually-marked ballots, arranged for registration with the selection-indication means of the machine and also with the tally-indicating provision thereof.

Another object is to provide either or both of direct-reading vote means and encoded vote-recording means suitable for subsequent machine tabulation.

These and other purposes which will be apparent from the specifications are achieved by the present invention, a simple and preferred embodiment of which is illustrated in the drawings.

I achieve the purposes of the present invention by the use of a number of standardized, unitary electrical selection panels, generally one for each office to which a candidate is to be elected. Each panel has a multiple-position two-pole rotary selector switch mounted on an axis perpendicular to a dielectric board which holds the panel elements and circuitry. Each switch has an actuating rim projecting beyond the edge of its board. Along the edge of each board, adjacent to the switch, is a row of selection-indication lights. One pole of each switch served these indicator lights mounted on the same board with it; the power source actuates this pole at all times. Rotating the actuating rim of the switch selectively causes the illumination of one of the lights along the edge of the board, thus indicating the choice for that office. At the same time the second switch pole selects correspondingly from an equal number of circuits for recording the vote for that office. However, the second switch pole does not receive record-making current until the voter, having determined, for each office for which he wishes to vote, the selections indicated by the lights, finally decides to cast his vote.

The vote-casting is done by cranking a multiple-position voting switch, which furnishes current through the second poles of the switches on the panels. In the embodiment shown, the several switch boards are empowered successively, rather than contemporaneously, to reduce current requirements and to permit simplified electronic tape recording. The contacts of the second pole lead to vote-recording and counting apparatus. In the embodiment shown, such apparatus includes, first, counters arranged on the individual switch boards, one counter for each candidate choice, and second, encoding apparatus which records the selections from the several boards successively on the magnetic or perforated tape. Casting of more than one vote by each voter is prevented by a release mechanism operated for each voter by a switch connected to a privacy-curtain (not shown) or a separate switch (shown) at the table of the judges of election.

The circuit boards have plug-in connectors at one end. A frame which holds the boards properly spaced presents perpendicularly to these plug-in ends a common connector board into which the plug-in ends are inserted. The connector board supplies current and ground connection, and leads to the vote-casting switch as well as to the encoder.

Since the frame holds the switch boards so that their rotary selector switches are aligned with each other, the switch axes will be common. Each selector switch is provided with a bore having a latch provision. A gang-operation rod extends through these bores. Latch means permit engaging all the selector switches for simultaneous movement. The candidate choices are arranged horizontally in orders of position from left to right; those of each party in a multi-party election vertically in a fixed order of positions. If the voter chooses, he may engage the latch provision and thereby move the selectors together, thus to select all the candidates of a single political party. Disengagement of the latch provision is automatic, so that deviant choices from a "straight ticket" may be made. This straight-ballot provision also permits erasing the selections simultaneously after the vote is recorded, to preserve secrecy of the ballot cast from the next voter using the machine. Mechanical connection (not shown in this embodiment, for simplicity) with the end of the voting-crank casting cycle would accomplish this erasure automatically.

Printed ballots, arranged similarly to familiar manually-marked ballots, are provided under transparent front plates and rear plates of the machine, the rear plate surface being concealed during the voting by a locked cover. The spacing of the rows and columns of names on the printed ballots correspond to the spacings of the lights on each board, and of the circuit boards from each other respectively. The cover plate of the machine is marked with an X, positioned over each light, so that, when burning, it will cast an illuminated shadow of the X on the translucent paper ballot. Each printed front ballot has a translucent square box adjacent to the name of each candidate, through which the indicator signal light will shine causing an X to appear in the box if that candidate is selected. In the positions for which there is no candidate, the ballot is printed with an opaque area to prevent the underlying X from appearing.

The right-hand column of the ballot is reserved for write-in voting, translucent for those offices for which write-ins are permitted, and printed opaque for those for which write-ins are not permitted. The voter may, if he chooses, select and illuminate a translucent area, and write in the name of his candidate on a paper tape drawn over the illuminated area of the printed ballot. The paper tape has a margin extending beyond the edge of the printed ballot. When one pole of the signal selector illuminates the write-in area, the other pole of the signal selector establishes a connection with a solenoid-operated validating stamp, located on each of the boards just beyond the edge of the printed ballot. When the votes are cast, any "write-ins" on the paper tape are verified by the stamp marking, as through a carbon paper strip, the margin of the tape adjacent to where the voter has written in his choice, to verify that no other vote for that office was cast.

The electromagnetic counters are arranged along the rear (or underside edges of the boards. They are spaced in columns and rows like the indicator lights. A transparent paper or cellulose film "ballot" identical to the ballot mounted on the face of the machine is imprinted with the names of the candidates arranged with the same spacing as the front surface ballot; in fact, the same printing plates may be used. After the polls are closed, the polling place officials may open the rear cover plate, and read the counters through the transparent ballot.

The encoder type record permits a subsequent check on the tallying of the vote of each machine, or if separately housed and connected to a plurality of machines, permits multiple recording. If such an encoder is used, it may be read and mechanically tallied by suitable apparatus provided at a central election office.

Referring to the drawings:

FIGURE 1 is a top view of a voting machine embodying the present invention, with a ballot form and a "write-in" voting reel in place, the reel being shown with its cover broken away.

FIGURE 2 is a front edge view of the machine shown in FIGURE 1.

FIGURE 5 is a sectional view taken along line 5—5 of FIGURE 4, including one surface of a unitary selection panel.

FIGURE 6 is a fragmentary sectional view taken along line 6—6 of FIGURE 4, including the opposite surface of said selection panel.

FIGURE 12 is schematic illustration of the record made on an encoder tape.

*Selection Panels*

Figure 4:
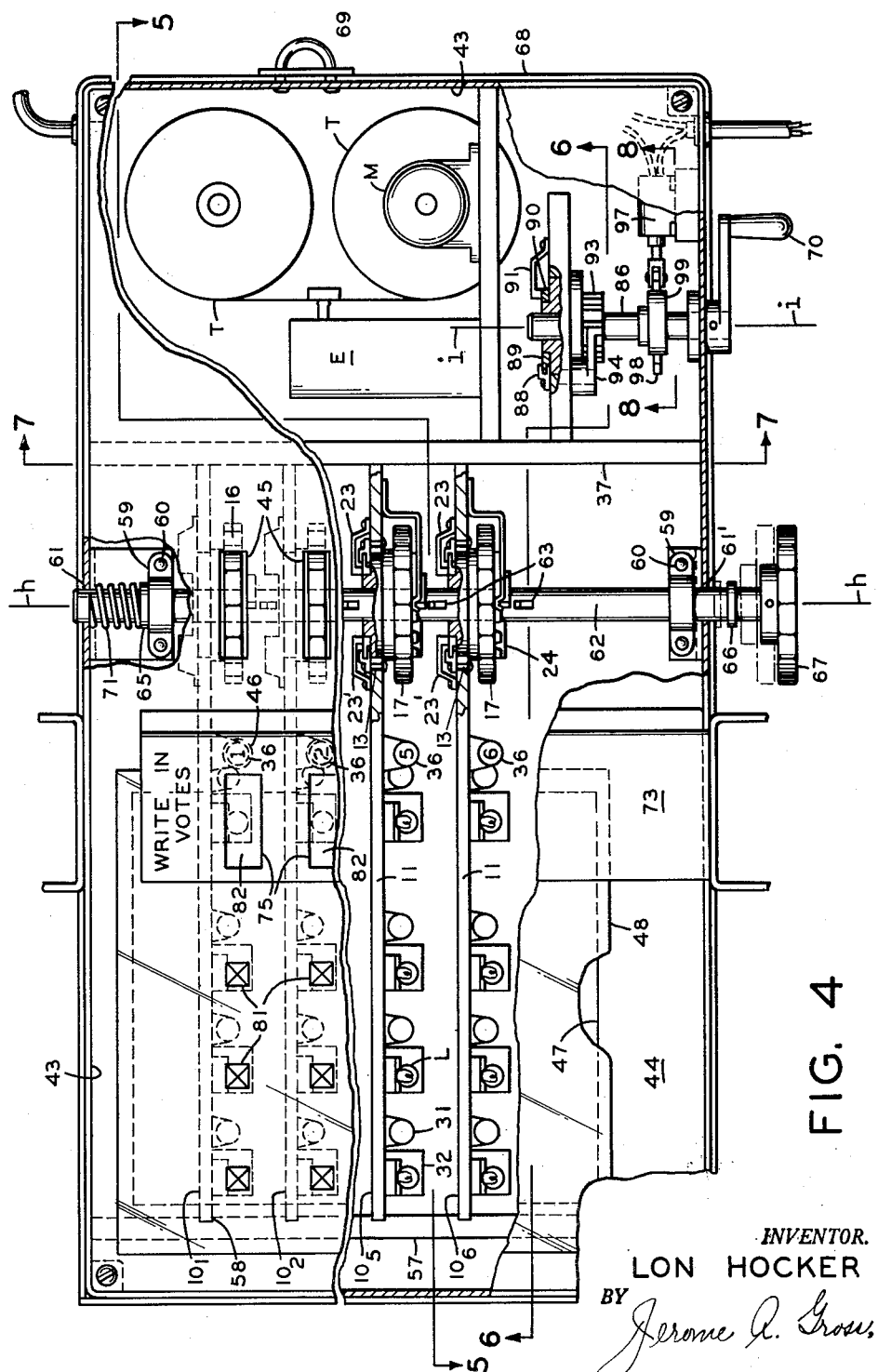
FIGURE 4 is a somewhat fragmentary enlarged view, corresponding to FIGURE 1, with the ballot form removed, the front cover being partly broken away.

Each of the voting machines made in accordance with the present invention contains a plurality of standardized selection panels, one panel for each line of the ballot; normally this would mean one panel for each office to be filled. The simplified ballot of FIGURE 1 shows only six lines; hence six of the panels would suffice. In practice, to provide for a foreseeable number of offices, thirty or more of the panels might be provided. In FIGURE 4 such a machine is broken away to show four of such panels in upper edge view.

The selection panels illustrated provide for only four selection columns; enough for three political parties plus one write-in candidate. This again is a simplified showing; in a machine as utilized, nine or ten choices might be provided on each panel.

The selection panels or boards, each generally designated 10, are assembled upon rigid oblong dielectric board strips which extend substantially the full depth of the voting machine and are laterally. Each has an upper edge 11 positioned just below the upper surface of the machine, and a lower edge 12. A bore 13 perpendicularly through the panel 10 spaced from the upper edge 11 mounts a rotary, multiple-position, two-pole selector switch generally designated 14, by means of a hub 15 which fits within the bore 13. The hub 15 is molded of a dielectric material, integrally with a selector wheel 16 whose rim 17 projects out beyond the board's uper edge 11. The obverse face of the selector wheel 16 shown in FIGURE 6 is molded to provide a circular detent race 18 having indentations 19 corresponding in angular position with several positions of the selector switch 14. A leaf spring detent yoke 20, mounted at one end to the board 10, presses its yoke tips 21 into diametrically opposite indentations 19, thus holding the hub 15 pressed within the bore 13 of the board 10 and also assuring that the switch selector wheel 16 will squarely contact the switch contact which are now to be described.

On the reverse face of the selector wheel 16, shown in FIGURE 5, hub 15 is housed in the bore of the board 10, and provided with two lands 22, 22', they being arcuate inserts of electrically conductive material, each extending less than 180°. The lands 22, 22' are fed with electric current through their separate spring-like land contacts 23, 23' bearing against their respective surfaces.

In order to stop the selector wheel 16 from being turned so far as to unseat the land contacts 23, 23' from their respective lands 22, 22', a travel-limiting stop 24 is molded in the detent race 18, but projecting farther than the indentations 19. The length of the stop 24 is such that it comes into contact with the yoke tips 21 at the limits of travel of the switch 14.

Integral with and projecting radially outward from each land 22, 22' and at positions 180° removed from each other, are rotor contact tongues 25, 25' which serve as the two poles of the selector switch 14. They engage, in a multiplicity of angular positions established by the detent race indentations 19, near semi-circles of switch contacts 26a, 26b, 26c, 26d, and 26a' 26b', 26c', 26d', respectively disposed 180° from each other. When the selector wheel 16 is so positioned that rotor tongue 25 engages contact 26a, then rotor tongue 25' will engage contact 26a', etc.

The selector wheels 16 of the several selection panels 10 may be operated individually by manipulating their rims 17. For gang operation, each of the hubs 15 has a central bore 27 along an axis h–h which is perpendicular to the parallel planes in which the panels 10 are held in the voting machine. Mounted onto the front surface of each selector wheel 16 within the detent race 18 by a pin 28 molded therein, is a latching leaf spring 29, bearing a latch projection 30, which it urges toward the center of the bore 27.

The contacts 26a', 26b', 26c', 26d', are connected respectively, by printed circuitry extending through the panel 10 and along its opposite surface, to indicator lights La, Lb Lc, Ld, and thence to a common ground G. These lights La, Lb, Lc, Ld are located adjacent to the upper edge 11 and are linearly arranged along it in a spaced order, corresponding to the several columns on the printed ballot to be used on the face of the machine, as hereinafter described. In this spaced order of indication positions, the lights La, Lb, Lc, Ld serve as selection indication means when such a ballot is brought into registration with them.

Figure 3:
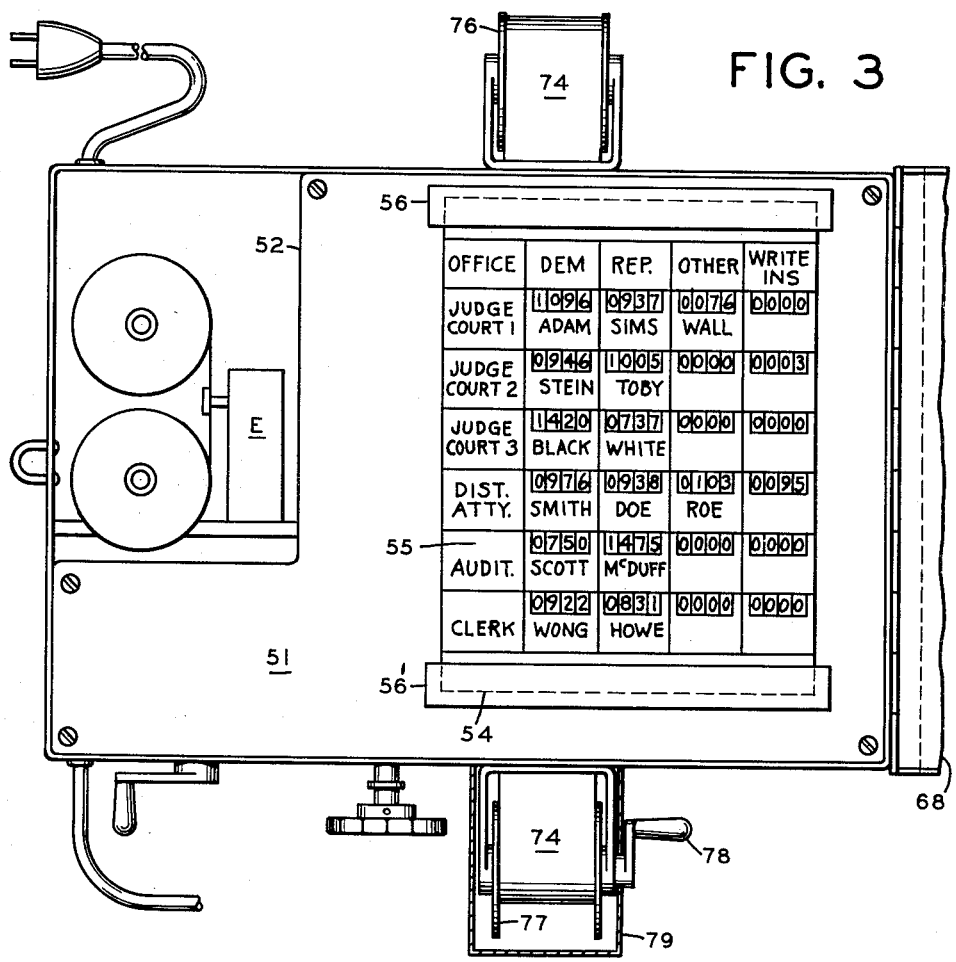
FIGURE 3 is a bottom view of the machine of FIGURE 1, with the botom cover plate opened to show the counters through a transparent tallying ballot.

The contacts 26a, 26b, 26c, 26d are connected by means of printed circuitry respectively to electrically-operated counters designated Ca, Cb, Cc, Cd, and thence to the ground G. The counters shown each include an electro-magnetic actuator 31 which drives a numerical indicator 32. Their count indications are presented downwardly, to be read from the underside of the machine as shown in FIGURE 3. The count indicators 32, like the indicator lights La, Lb, Lc, Ld, are spaced from each other in an ordered arrangement of positions corresponding to columns on a tallyingballot-form mounted on the underside of the machine as shown in FIGURE 3. Their arrangement along the panel lower edge 12 corresponds to that of the indicator lights La, Lb, Lc, Ld along its upper edge 11, but in reverse order, to permit correct registration.

Branching from each of the printed connections between the switch contact 26a, 26b, 26c, 26d, and the counters Ca, Cb, Cc, Cd, and carried through the panel 10 and along its opposite surface by printed circuitry to its right edge, are the parallel leads designated a, b, c, d, respectively which, like the ground G, have male plug-in terminals 33 at the right edge of the board 10.

The land contact 23 is provided with current through a lead designated y. The land contact 23' is provided with current though a lead designated x. Each of these also has a male plug-in terminal 33 at the right edge of the board.

Connected in parallel with the counter Cd is an electrically-actuable stylus assembly, consisting of a solenoid 34 which, when energized, projects a validating stamp 35 upward. FIGURES 5 and 6 show the validating stamp 35 in retracted position. Attached to the projecting end of the validating stamp 35 is an interchangeable impressing character 36. These impressing characters 36 are the FIGURES 1, 2, 3, 4, etc. which correspond to the selection panels $10_1$, $10_2$, $10_3$, etc. in the order they are assembled within the machine. Thus the panels 10 may be identified by row. The impressing characters 36 form a column to the right of the successive columns of the lights La, Lb, Lc, Ld.

Connector Board

Figure 7:
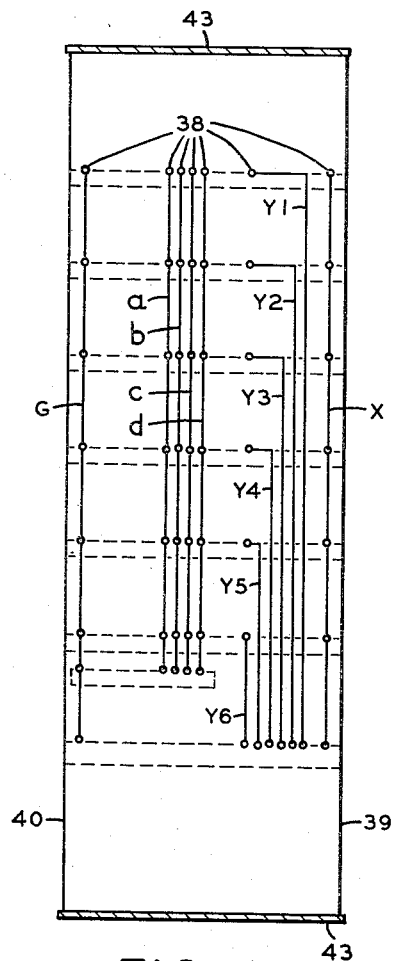
FIGURE 7 is a view taken along line 7—7 of FIGURE 4 showing the connector board into which the selection panels are plugged.
Figure 11:
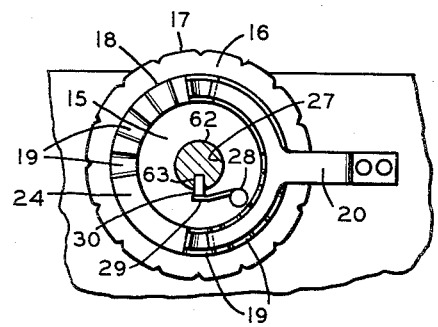
FIGURE 11 shows the latch engagement of a selector switch to the gang rod, as seen along line 11—11 of FIGURE 10.

Shown in FIGURES 4, 5, and 6 at the right end of the several selection panels 10 is a connector board generally designated 37, formed of dielectric material and wired as shown in FIGURE 7. The wiring may be by printed circuitry to a number of female terminals 38 which receive the plug-in male terminals 33. The stations or levels at which each of the panels 10 plug in to the connector board 37 are shown by the six pairs of laterally dashed lines which extend across it. The connector board 37 has an edge 39 shown in FIGURE 7 at the right side, which is held in the machine at the level of the upper panel edge 11; and has an opposite edge 40 at its lower edge, held within the machine at the level of the panel lower edge 12. The printed circuitry includes in parallel lines, a common ground G near the lower edge 40; common a, b, c, d, connectors, and the common current supply connector x which serve the indicator lights La, Lb, Lc, Ld. The connector board 37 provides for vote-counting current supply to each of the selection panels 10 by a separate vote-counting current supply lead y1, y2, y3, y4, y5, y6 to each of the panels. The female terminals 38 are in parallel lines, so that the panels 10 fit interchangeably.

The lead x is supplied with electrical current whenever the machine is "plugged in" to a current supply, not shown. However, the leads y1, y2, etc. are provided with current only when they are respectively connected to a current supply through the vote-casting switch, hereinafter described. The leads a, b, c and d connect to an encoder E, hereinafter described.

Organization of Components

The voting machine has a metal rectangular frame 43, shown sectionally in FIGURE 5, which extends around its edges, and has a corner angle to which a top cover plate 44 is secured. The cover plate 44 is blanked out to provide a column of oblong openings 45 through which the selector rims 17 project, these openings being symmetrical with respect to the hub axis h—h when viewed from above as in FIGURE 1.

To the left of the rectangular openings 45 is a column of circular openings 46 which permit the validating stamps 35 to project therethrough. To the left of the column of circular openings 46 is a large rectangular window-opening 47 covered with a glass top window 48, over which fits a printed ballot generally designated 49 and shown only in FIGURE 1, held in place by top and bottom edge clamps 50, 50'. Any convenient clamping means will suffice.

Secured at the under side of the frame 43 is a rear plate 51 shown in FIGURE 3, having a cut-out edge 52 to permit removal of the encoder reels, hereafter described. The rear plate 51 has a large rectangular window-opening 53 equipped with a transparent glass covering window 54 whose outline, shown in FIGURE 3, is of the same size as that of the glass top window 48. A transparent tallying ballot generally designated 55, hereinafter described, covers the under surface window 54. It is held thereon by upper and lower edge ballot clamps 56, 56'.

The connector board 37 is fixed across the rectangular frame 43 to extend from its upper edge to its lower edge as shown in FIGURE 4. Arranged parallel to it, near the left edge of the machine, is a removable circuit board support 57, having notches 58, spaced to coincide with the spacing of the rows of female terminals 38 along the connector board 37, which receive and support the left ends of the circuit boards 10. The removable circuit board support 57 is held within the frame 43 by any convenient means.

Figure 10:
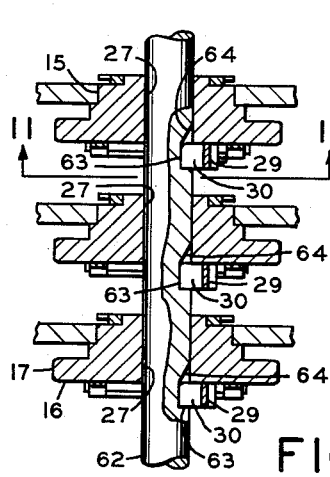
FIGURE 10 is a fragmentary view, partly in section, showing rotary selector switches as engaged by the gang rod when the "straight ticket" knob is pushed upwardly to the position shown in dashed lines of FIGURE 4.

A pair of aligned pillow blocks 59, held by rivets 60 to frame angles extending beneath the top cover plate 44, establish the axis h—h of the selector switch hubs 15. On this axis is inserted, through circular bores 61, 61' in the upper and lower edges of the frame 43, a gang rod 62 whose outer diameter fits slidingly within the inner diameter of the pillow blocks 59 and the hub bores 27. The rod 62 has the plurality of aligned notches 63, spaced to correspond with the spacing of the boards 10. The notches 63 together form an interrupted keyway whose width is sufficiently great to receive the latch projection 30 attached to each selector switch 15. As shown in detail in FIGURE 10, each of the notches 63 has a tapering entrant portion 64, so that the latch projections 30 may be together disengaged (as shown in FIGURE 4) by moving the rod downward from the engaged position shown in FIGURE 10. A stop collar 65 is fixed to the rod 62 beyond the upper pillow block 59, and another stop collar 66 is secured outwardly of the lower edge of the frame 43 as shown in FIGURE 4. These fix the travel of the gang rod so that the notches 63 will be brought to the respective levels of the latch projections 30.

A straight ticket selection knob 67 is fixed onto the end of the rod 62. It is operated by pushing into the position shown in dashed lines in FIGURE 4 and then turning, thus catching all of the latch projections 30 into the notches 63, regardless how the selector switches 14 may have been previously set. The voter may then turn the selector switches 14 simultaneously so that the indicator lights La, Lb, Lc or Ld light up in columns. Since the orders of indication position correspond with the several political parties named on the ballots in inter-party elections, straight ticket selection is made possible.

A coiled compression spring 71 inserted between the stop collar 65 and the inner side of the frame 43, returns the rod 62 to disengagement whenever the knob 67 is released.

Although the numerical count indicators 32 are at the bottom side of the machine and hence effectually concealed, it is desirable to provide over the tallying ballot 57 at the underside of the frame 43, to cover the tallying ballot 57, a simple opaque hinged bottom cover 68 having any simple locking provision 69.

A voting crank 70 projects from the frame 43 and is mounted on an axis $i$—$i$ parallel to the axis $h$—$h$. This is as shown in FIGURE 4. Parallelism is provided so that, by any simple mechanical coupling to the gang rod 62 (which coupling is not shown), provision may be made for erasing the selection indications after the vote is cast. This is accomplished by setting each selection switch to the write-in position by appropriately actuating the gang-rod 62 at the end of the vote casting cycle.

"Write-In" Voting

Provision is made for recording and verifying write-in votes, as follows:

Mounted onto the upper surface of the top cover 44, by an offset or "joggled" flange 72 which extends over the glass window 48, is a metal write-in vote shield 73. It is spaced above the top cover 44 sufficiently to accommodate a paper write-in ballot tape 74 beneath it and above the outer surface of the paper ballot 49 which lies atop the top glass 48. As is seen in FIGURE 1, the paper write-in ballot tape 74 has a right margin which extends beyond the top glass 48 and ballot 49; this margin overlies the circular openings 46 for the stylus cores 45. Adjacent to the circular openings 46, large rectangular "write-in" openings 75 are provided through the shield 73.

Secured to the frame 43 in line with the write-in vote shield 73, is a write-in paper supply reel 76, mounted on the upper edge of the frame 43 as shown in FIGURE 1. At the lower edge of the frame 43 is similarly mounted a write-in vote storage reel 77. The storage reel 77 has an irreversible crank mechanism 78, not shown in detail; and it is protected by a simple covering box 79.

Figure 13:
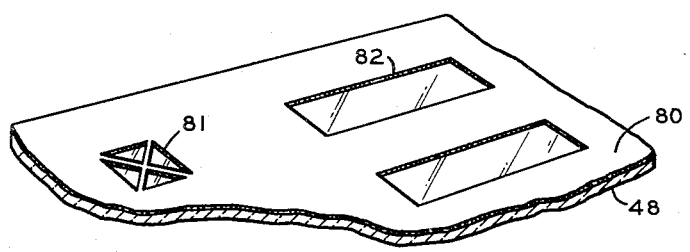
FIGURE 13 is an enlarged view of a portion of the top cover glass of the upper fragment of FIGURE 4, showing windows to indicate candidate choices in one column and to provide illumination for write-ins in an adjacent column.

Most of the area of the glass top window 48 is masked off so as to be opaque, as by a coating of opaque paint (as shown in FIGURE 13) applied by a screening process. Uncoated light-transmitting areas of two types are left through the coating 80. The first of these types consists of selection-indication illuminated windows 81 appearing in all of the candidate choice columns. These are square, clear areas having an "x" marking of the opaque paint screened across them, in registration with the lights $La$, $Lb$ and $Lc$. The candidate selection "x" windows 81, when illuminated, show through the ballot in the manner as illustrated in FIGURE 1. The second type consists of the substantially larger, rectangular "write-in" illuminating windows 82, which transmit light from the write-in selection indication lights $Ld$ to the areas in registration with the shield windows 75.

In order to write in a vote, the voter turns the selector switch 14 to illuminate the window 82 in the applicable row, and writes the name of the candidate of his choice through the shield window 75 on that portion of the paper tape ballot 74 over the illuminated window 82. On turning the voting crank to cast his vote, an impression from the impressing character 36 of the solenoid-actuated stamp 35 is made on the rear surface of the paper tape 74 adjacent to the place where he has written in the name. Such impression may be made through a carbon-paper strip, not shown, striking against the over-laying portion of the shield 73. By the crank mechanism 78 on the write-in vote storage reel 77, the voter himself causes his own "write-in" votes to be stored after they have been so duly verified. If desired, automatic means may instead be provided to "take up" the storage reel 77.

Vote Casting

The voting crank 70 is secured to the outer end of a vote-casting shaft 86 having an axis $i$—$i$. Turning the shaft 86 actuates a rotary vote-casting switch generally designated 87, mounted at its inner end. This switch is of the single-pole multiple-position type, having that multiple number of contacts $88_1$, $88_2$, $88_3$, $88_4$, etc. which equals the number of selection panels 10 utilized. Contacts $88_1$, $88_2$, etc. are provided with connectors to the lower female terminals 38 shown in FIGURE 7, by which they are connected to the printed leads $y1$, $y2$, $y3$, $y4$, etc. respectively. These contacts are engaged, one at a time, by the vote-casting switch tongue 89 which projects radially outwardly from a rotating land 90, which is served with current through a spring land-contact 91. The current is supplied from a transformer shown only in the wiring diagram, FIGURE 14.

Figure 14:
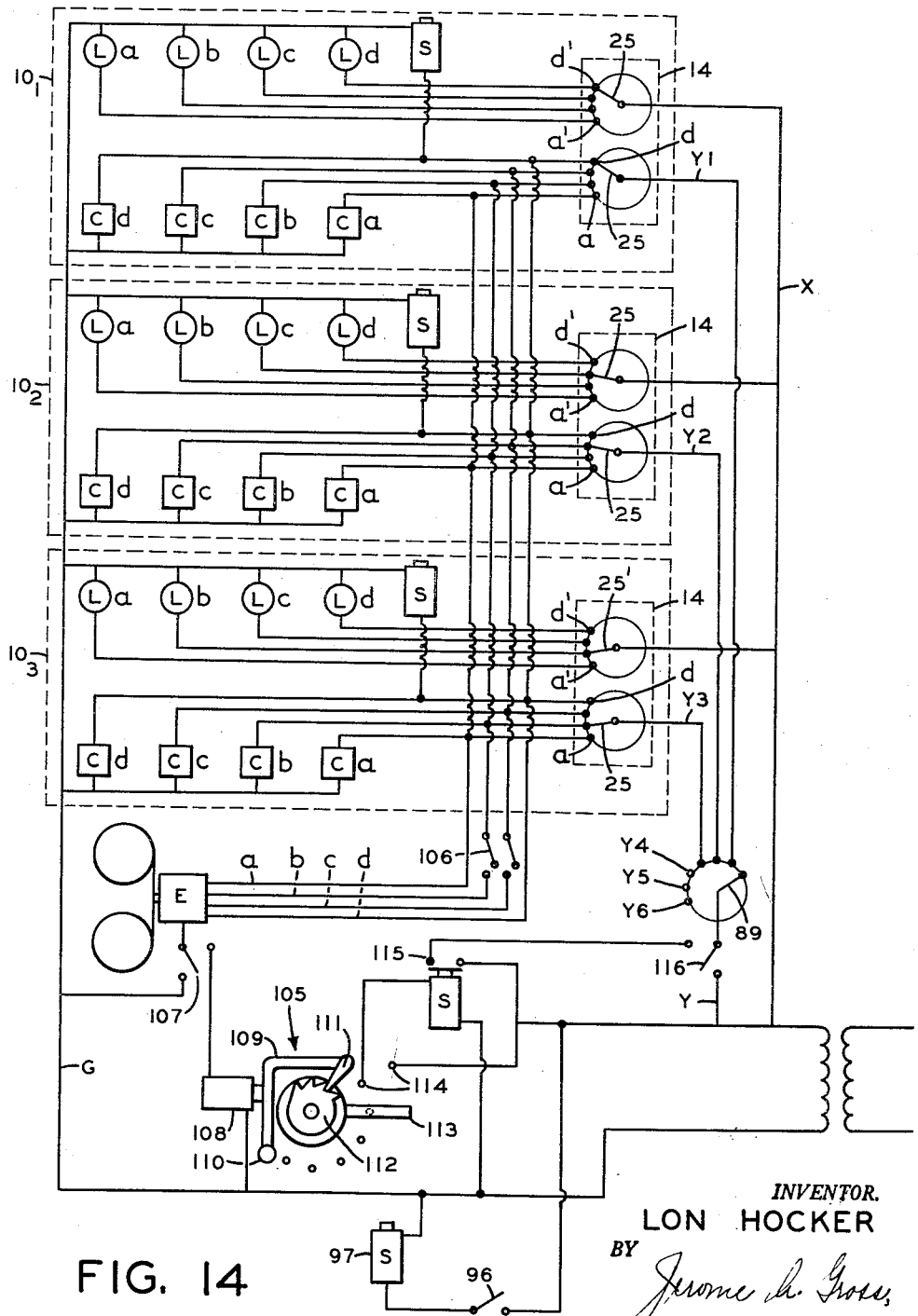
FIGURE 14 is a wiring diagram simplified to show only three selection panels, also showing alternate circuitry used for "at large" elections where more than one person is to be elected to a single named office.

In FIGURES 5 and 14 an encoder E is shown schematically. It consists of a multiple-head tape recording device, such as the type which uses magnetic tape, on tape reels T, T', driven by a motor M. In a simple embodiment, there may be as many magnetic recording heads $92a$, $92b$, $92c$, $92d$ as there are selection-indication positions on each of the selection panels 10. The $a$, $b$, $c$, $d$ connections to the encoder E are shown in FIGURE 7 and in FIGURE 5. The motor M need be actuated only while the rotary vote casting switch 87 is being turned. The wiring diagram, FIGURE 14, is shown somewhat simplified, without any circuitry to interrupt current to the motor M.

From the wiring diagram, FIGURE 14, and from FIGURE 5, it is apparent that each time the voting crank is turned through one rotation, the tongue 89 will sweep the contacts $88_1$, $88_2$, $88_3$, etc successively, in the direction limited by a ratchet 93 mounted on the shaft 86. Teeth of the ratchet 93 are in turn engaged by a pawl 94 which prevents cranking in the wrong direction. Thus, turning the vote casting crank 70 supplies a current through the vote casting switch 87 successively to the selection panels $10_1$, $10_2$, etc., in order of their rows, the current being fed to whichever switch contact $26a$, $26b$, $26c$, $26d$ has been selected by setting the selector switch 14 on each of the panels 10. The current actuates both the electromagnetic counter $Ca$, $Cb$, $Cc$, or $Cd$, whichever has been selected, and the encoder circuit $a$, $b$, $c$, or $d$ in parallel with such counter.

Assuming the machine contains but six of the selection panels 10, the first impulse to the encoder E indicates which of the selections $a$, $b$, $c$, or $d$ has been made on the first panel $10_1$; and the successive impulses to the encoder indicate the selection made on the successive panels $10_2$, $10_3$, etc. Thus the encoder E records the position of each of the selector switches 14 in sequence. A type of tape record made by such an encoder E is shown schematically on FIGURE 12; this depicts an encoder tape strip 95 bearing dots which signify magnetically-recorded pulses to the encoder heads $92a$, $92b$, $92c$, $92d$ in their various positions. FIGURE 12 includes a record of several successive vote-casting operations.

Figure 9:
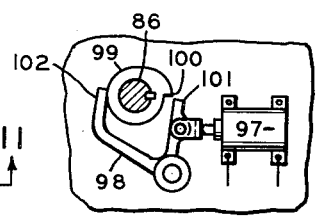
FIGURE 9 is a view similar to FIGURE 8 showing the operation of said release mechanism.
Figure 8:
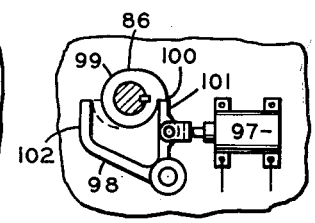
FIGURE 8 is a fragmentary view taken along line 8—8 of FIGURE 4 showing the polling place judges' release mechanism.

In order that no voter may vote more than once, a remote, normally-open judges' release switch 96 is provided. As shown in the wiring diagram, FIGURE 14, this switch supplies current to, and is in series with, a voting-release solenoid 97. The solenoid 97 is pinned to a pin-mounted rocking escapement yoke 98. Within the yoke 98 is a release cam 99, mounted on the vote-casting shaft 86 and presenting a cam stop shoulder 100 against the tip of a first arm 101 of the escapement yoke 98, as in FIGURE 8. When the solenoid 97 is actuated as in FIGURE 9, the escapement yoke 98 rocks, the stop shoulder 100 is released, and the shaft 86 may turn. The second arm 102 of the yoke 98 then rides along the periphery of the release cam 99, rocking it back to the position shown in FIGURE 8. At the close of one turn of the crank 70, the tip of the first arm 101 again engages the stop shoulder 100. The sense of rotation is as shown by the arrow in FIGURE 8.

*Provision for At-Large Elections*

Certain types of electrons, such as election for several free-holders, or election of congressmen, aldermen, etc. at large, require the selection of a number of candidates for the same named office, and permit the voter to vote for a given number out of a greater number of candidates. The wiring diagram, FIGURE 14, includes a provision for utilizing the voting machine for such elections. In this provision, the names of the several candidates may be listed, one per row, in the first or "a" column. Each voter is to vote either for or against each candidate named. His vote "for" is made by turning the selector switch 14 to the "a" column; his vote "against" by selecting the "b" or "c" column. He may also select the "d" column for a write-in candidate.

In the "b" and "c" leads to the encoder E a double pole switch 106 is provided. For such an "at-large" election all circuits except "a" and "d" are opened by the switch 106. Inserted into the ground connection from the encoder E, a double-throw switch 107 puts in series an electromagnetic pulse counter generally designated 105, which is pre-set to limit the number of votes which may be cast in the election.

Interruption of the current, as the rotary vote casting switch 87 moves from one contact 88 to another, causes pulses. Each time a pulse passes through the encoder E (as a result of voting "for" one of the candidates), and as it passes through an electromagnetic coil 108 of the pulse counter 105, the coil draws toward it a counter arm 109 which swings on a pivot 110. This actuates a pawl 111 which engages a ratchet sector 112 of the counter 105 and turns it one notch. The arm 109 is returned between pulses by a spring, not shown.

The ratchet sector 112 is part of a pivoted switch-closing bar 113 which is preset as above mentioned to positions 2, 3 or 4, etc., the number of votes permitted to be cast. The angular spacing between each position is equal to the angle about which the pivoted bar 113 is turned by each swing of the arm 109. Assuming only three candidates may be voted for, it is set to the "3" position. After the first three pulses, the switch-closing bar 113 will close a set of switch contacts 114.

A normally-closed, solenoid-operated switch 115 is inserted in series with the power supply to the vote-casting switch 87. This insertion is made by throwing a single-pole, double-throw switch 116 (the switches 106, 107, and 116 may be ganged so as to be set simultaneously) in series. The solenoid-operated switch 115 is connected across the power supply and through the contacts 114 of the pulse counter 105. Whenever the maximum number of offices to be filled has been "pulsed" through the pulse counter 105, the solenoid-operated switch 115 is thus caused to open, and no more current can pass through the vote casting switch. This will prevent further recording both by the encoder E and also by the counters Ca, Cd in each row. Automatic re-set of the pulse counter 105 may be provided if desired.

*Ballot Printing*

One of the unique advantages of the present invention is the use of the printed ballots 49, 55 on the front and rear faces of the voting machine. These ballots may be printed in the same printing with ballots which are used for manual vote-casting, such as by absentee voters or in precincts where no voting machines are provided.

The front ballot 49 thus has the names of candidates in positions arranged in columns or rows, the columns being designated with political party headings where applicable. The front ballot 49 is printed on paper which is translucent, and provided with square-outlined, selection-indication boxes next to the name of each candidate, arranged for registration with the "X" windows 81 so that the selection-indication lights 1a, 1b, 1c, 1d may shine through. Referring to FIGURE 1, these translucent boxes are designated as the ballot "windows" 120. Whenever a political party has failed to nominate a candidate for a particular office, or where there are more columns than political parties, an opaque area 121 is imprinted on to the ballot instead of the "window" 120. In the "write-in" column where no write-in is permitted, an opaque oblong 122 may be imprinted; otherwise, large areas, as translucent as the ballot "windows" 120, will be left in a column row along the right margin of the ballot. These areas illuminate the write-in ballot tape 74 when column "d" is selected. Opaque areas 122 would not show through the overlaying tape 74.

The tallying ballot 55, affixed to the under surface of the machine, is preferably imprinted on transparent plastic film so that the counters Ca, Cb, Cc, Cd may be readily read through it. The candidates' names are imprinted in the same positions as on the front ballot. The same printing plates may be utilized, both for economy and as an assurance against mistakes.

Such printed ballots greatly simplify the setting-up of the voting machines. Ballots must usually differ from township to township; and the setting-up of machines for particular precincts by a central election office has heretofore been an arduous, exacting task. The machine herein described requires no individual setting-up, except for at-large elections.

*General*

The encoder tape reels T—T' are readily removed from the machine and may be read on a tallying apparatus at the central election board. On the other hand, the transparent ballot 55 provides for tallying by the precinct election officials, immediately after the polls have closed.

Inasmuch as the majority of the components which may exprience service difficulties (such as the selector switches 14, the lights La, Lb, Lc and Ld and the counters Ca, Cb, Cc and Cd) are assembled on the selection panels 10, servicing is easy. The gang rod 62 is drawn outward by releasing the collar 65, the left hand circuit board support 57 is removed, and any of the selection panels 10 may be unplugged and another panel 10 substituted for it. As noted, the panels 10 are standard except for the readily replaceable impressing characters 36. The machines as a whole are so light in weight that, in case of serious difficulty, a substitute machine may be quickly delivered from the central election office.

The contacts $88_1$, $88_2$, etc. of the rotary vote-casting switch 87 are shown to occupy an arc of not more than 180°, so that the votes are cast during a half-turn of the voting crank 70. This provides a second half-turn of the crank 70 which may be utilized by simple mechanical or electrical coupling for clearing the voter's selection-indications, by pressing the gang rod 62 inward and rotating it to bring all the selections back to the "write-in" positions. This second half-turn of the crank 70 may also take up the write-in storage reel 77 and re-set the pulse counter 105.

Because there are no mechanical and only electrical connections between the selection-indication functions of the machine and the recording-counting functions of the machine, these functions may be housed separately, connected with a detachable electrical cable, for central counting of the multiple vote casting booths in a polling place, or for even greater ease of transportation. In carrying out the vote-counting function, other types of counter equipment such as glow tubes, may be employed. In the present embodiment, however, for simplicity of illustration both the electromagnetic counters and the tape-recording provision are housed integrally with the selection-indication functions, and the electromagnetic counters are mounted on the unitary selection panels.

Various other modifications of the present invention will occur to persons skilled in the art. This specification is not therefore to be construed narrowly, but instead as fully coextensive with the claims.

I claim:
1. For use in a voting machine, selection means having a write-in provision, said means comprising a multiple-position signal selector, an electrically-actuable validating stamp operatively connected to one position of the signal selector, means to accommodate a write-in ballot adjacent to said validating stamp, in position to receive an impression therefrom, and means for establishing a selection-recording signal through the selector, thereby to actuate the said stamp should its said position on the signal selector have been selected.

2. A voting machine having a plurality of the selection means defined in claim 1, the said plurality of means being arranged in adjacent rows, the validating stamp in each row bearing a different impressing character, whereby a write-in ballot impressed with such character is identifiable with the row whose stamp so impressed it.

References Cited in the file of this patent

UNITED STATES PATENTS

| | | |
|---|---|---|
| 783,156 | Taisey | Feb. 21, 1905 |
| 868,062 | Ale | Oct. 15, 1907 |
| 1,149,113 | Brumder | Aug. 3, 1915 |
| 1,170,731 | Bohan et al. | Feb. 8, 1916 |
| 1,230,880 | Dyer | June 26, 1917 |
| 1,307,913 | McCarthy | June 24, 1919 |
| 1,410,984 | Baker | Mar. 28, 1922 |
| 1,420,879 | Sproat | June 27, 1922 |
| 2,054,102 | Shoup et al. | Sept. 15, 1936 |
| 2,190,019 | Foster | Feb. 13, 1940 |